United States Patent [19]

Shigemori et al.

[11] 4,062,050

[45] Dec. 6, 1977

[54] MAGNETIC CARD READER

[75] Inventors: Youjiro Shigemori; Yoshio Mitumori; Toshiaki Yonezawa, all of Shizuoka, Japan

[73] Assignee: Star Seimitsu Kabushiki Kaisha, Japan

[21] Appl. No.: 668,406

[22] Filed: Mar. 19, 1976

[30] Foreign Application Priority Data

Mar. 20, 1975 Japan .................... 50-36538[U]

[51] Int. Cl.² ............... G11B 15/60; G11B 15/12; G11B 19/02
[52] U.S. Cl. .................... 360/130; 360/61; 360/69
[58] Field of Search .............. 360/130, 2, 88, 61, 360/69; 235/61.11 D

[56] References Cited

U.S. PATENT DOCUMENTS

| 3,157,868 | 11/1964 | Buslik | 360/130 |
| 3,648,023 | 3/1972 | Bach | 235/61.11 D |
| 3,712,973 | 1/1973 | Karl | 360/88 |
| 3,898,687 | 8/1975 | Schmidt | 360/2 |
| 3,940,796 | 2/1976 | Haun et al. | 235/61.11 D |
| 3,947,663 | 3/1976 | De Sandre et al. | 235/61.11 D |

Primary Examiner—Robert S. Tupper
Attorney, Agent, or Firm—Robert E. Burns; Emmanuel J. Lobato; Bruce L. Adams

[57] ABSTRACT

A card reader is provided which includes backup means for urging a coded region of a magnetic card against a transducer in a proper orientation and with a proper pressure. The backup means is disposed opposite to the transducer on the other side of a card guide slot, and includes a ball head having a spherical surface which is normally biased by a spring to its operative position extending into the guide slot in which the gap defined between the transducer and the ball head is less than the thickness of a card. As the card is moved through the guide slot, the ball head is moved by the card away from the transducer against the resilience of the spring, but provides a single point backup of the card against the transducer before such movement in the opposite direction occurs.

10 Claims, 4 Drawing Figures

MAGNETIC CARD READER

FIELD AND BACKGROUND OF THE INVENTION

The invention relates to a magnetic card reader, and more particularly to a magnetic card reader including a novel backup means which urges a magnetic card against a transducer as it is moved through a guide channel.

When a magnetic head or transducer is utilized to read a code from a sound track in a stripe formed by a magnetic medium formed on a card, it is necessary that the magnetic core of the transducer be maintained in close contact with the stripe surface. In a known reader of the type in which a card is conveyed at a given rate by an electric motor, the card is fed past the transducer by a drive belt or feeder roller after it is introduced into the guide channel, there is provided a backup roller or capstan on the opposite side of the guide channel at a position opposite to the transducer for urging the card against the transducer. Such backup roller or capstan comprises a cylindrical body which is rotatable about a fixed axis, and is formed of a resilient material such as a rubber. In order to orient the card in a manner such that the stripe surface of the card be maintained in exact engagement with the yoke or magnetic core of the transducer, the cylindrical surface of the backup roller or capstan must maintain a linear contact with the opposite surface of the card with a uniform pressure. This requires that the backup roller or capstan be formed so as to have a uniform outer diameter throughout its length and that its axis be correctly aligned. However, it is difficult to maintain such requirements over a prolonged period of use. This difficulty is caused by the fact that cards, such as a bank card, credit card or passenger ticket, for example, which are owned by a multiplicity of users are not always maintained in a flat condition, but may be distorted, folded or creased. If such a distorted card is passed through the card reader, the surface of the backup roller or capstan may be subject to a localized abrasion or its axis may be urged to become eccentric. To compensate for such abrasion or eccentricity, the backup roller or capstan may be initially biased to engage the card with an increased pressure. However, this results in an increased friction between the magnetic coating of the card and the transducer, thereby damaging the card.

On the other hand, in a recently developed card reader in which a card is manually operated, the card may be passed through the guide channel in varying orientations depending on the manner of use, so that some provision is necessary to maintain a proper engagement between the magnetic stripe of the card and the surface of the transducer. To this end, there has been a proposal to provide a backup roller which is similar to the one used in the motor fed card reader. However, in a manually fed card reader, the backup roller is subject to an increased damage since a hard card having a vinyl chloride base, as prescribed by the Bankers Association of various countries, may be brought against the backup roller with an irregular operating pressure or impact, depending on the manner of use by the users. In addition, damage may be caused to the backup roller for other reasons.

SUMMARY OF THE INVENTION

Therefore, it is an object of the invention to provide backup means which is suitable for use in a conventional card reader in place of the conventional backup roller mentioned above.

It is another object of the invention to provide a card reader having backup means which is simple in construction and assembly and which is capable of maintaining the initial proper orientation for a prolonged period of time.

It is a further object of the invention to provide a card reader which includes a control switch for cooperating with backup means to enable the transducer for a reading operation as a card reaches the region of the transducer.

In accordance with the invention, a ball head having a spherical surface is disposed in opposing relationship with the magnetic core of a transducer on the other side of a guide channel. Normally the ball head is resiliently biased so that its forward end extends into a predetermined position within the guide channel, and is adapted to be retracted by a slight amount as a card moves past it, while acting to urge the magnetic stripe of the card against the magnetic core. The ball head makes a single point engagement with the opposite surface of the card, so that it is only necessary to adjust the spacing between the surface of the magnetic core of the transducer and ball head initially when it is installed or mounted in order to assure a proper card orientation for a prolonged period of use. The adjustment can be easily achieved since the above spacing may be any value less than the thickness of a card, and thus the ball head may be in substantial contact with the magnetic core. Because the ball head is resiliently biased, its spherical surface may be formed of a hard non-magnetic material such as stainless steel or hard synthetic resin, for example, which presents no substantial abrasion problem.

In a further aspect of the invention, there may be provided a control switch which operates in connection with a movement of the ball head which occurs as the card moves past it. The control switch may be utilized to enable or disable an output gate for the transducer so that noises can be suppressed when the transducer is in its inoperative mode, that is, when no card is being read. In addition, with a manually fed card reader, the switch can be utilized to turn off the entire apparatus, thus avoiding an unnecessary power dissipation.

DETAILED DESCRIPTION OF PREFERRED EMBODIMENTS

Figure 1:
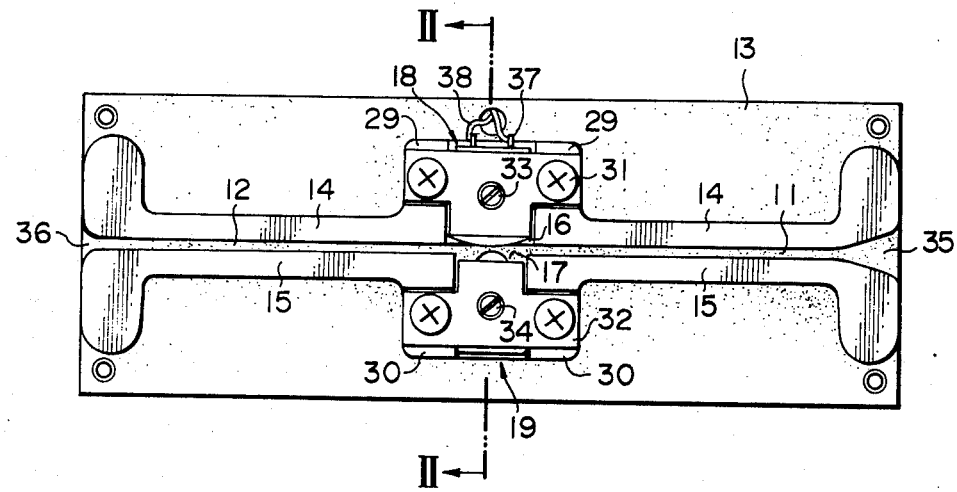
FIG. 1 is a plan view of a manually fed card reader incorporating the backup means according to the invention, with the housing of the reader removed.
Figure 2:
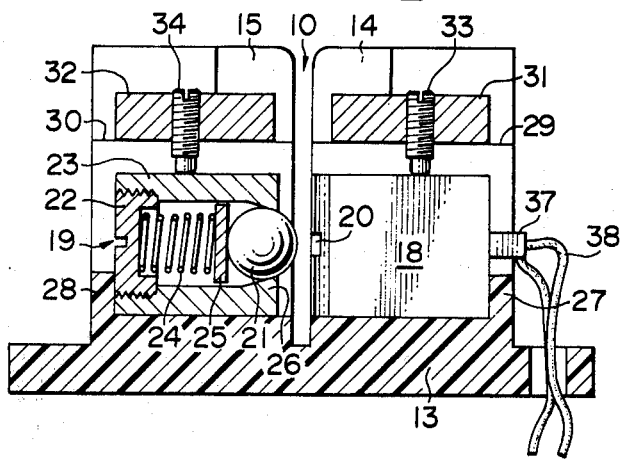
FIG. 2 is a cross section taken along the line II—II shown in FIG. 1.

Referring to FIGS. 1 and 2, there is schematically shown a manually fed card reader which is chosen for the description of the invention. However, it should be understood that the invention is not limited to the use of such reader, but is equally applicable to a known card reader of the motor fed type. The card reader shown comprises a card guide slot 10 including a first and a second channel portion 11 and 12 which are defined by a pair of sidewalls 14, 15 extending upwardly from a common base 13. Intermediate these channels 11, 12, a pair of recesses 16, 17 are formed in the sidewalls, and one of the recesses, 16, receives a magnetic transducer 18 while the other recess 17 receives backup means 19. As is well recognized, a magnetic tape is formed with a stripe of a magnetic medium in which data can be stored. The magnetic transducer 18 includes a magnetic core 20 which is sensitive to data stored on the magnetic stripe of the card. Thus, the magnetic core 20 has its surface positioned in substantial alignment with an imaginary plane joining the both sidewall portions 14, 14 of the oppositely adjacent channels 11, 12, so as to be capable of a close contact with the magnetic stripe of the card.

In accordance with the invention, the backup means 19 includes a ball head 21 which functions to urge the magnetic stripe of the card against the magnetic core 20 of the transducer 18 with an adequate pressure. In the arrangement shown in FIG. 2, the ball head 21 comprises a sphere of stainless steel which is received within a cylindrical socket 23. At its one end, the socket 23 is enclosed by a screwed lid 22, against which bears one end of a spring 24, the other end of which acts against the ball head 21 through an interposed plate 25 so as to cause the ball head 21 to project partially through an opening in the other end of the cylindrical socket 23 which is formed by a detent lip 26. The detent lip 26 retains the ball head 21 while permitting it to move in the axial direction of the cylindrical socket 23. The backup means 19 is located opposite to the magnetic core 20 in a manner such that the projecting spherical end of the ball head 21 extends into the guide slot 10 to define a gap with the core which is of a length less than the thickness of a card.

To obtain a proper orientation of the transducer 18 and the backup means 19, the recesses 16, 17 which receive each of them may be machined to size and provided with positioning portions 27, 28 respectively. This is most desirably achieved by integrally molding the common base 13 and the sidewall portions 14, 15 from a synthetic resin. In this instance, the sidewall portions 14, 15 of the both channels 11, 12 which are located adjacent to the respective recesses 16, 17 may be formed with shoulders 29, 30, and retaining plates 31, 32 may be threadably secured across the shoulders 29, 30 so that retaining screws 33, 34 extending from the plates 31, 32 may be adjusted to fix the transducer 18 and the backup means 19 in predetermined orientations.

With the described card reader, a magnetic card may be inserted into an inlet 35 of the first channel 11 of the guide slot 10, and manually pulled or pushed through the guide slot toward an outlet 36 of the second channel 12. Since the ball head 21 of the backup means 19 provides a single point backup of the card against the magnetic core 20 of the transducer 18, independently from the manner in which the user operates the card, it is assured that data recorded on the card be accurately read by the transducer 18. As shown, the transducer 18 is connected with a known playback circuit through a pair of leads 38 extending from terminals 37 thereof.

Figure 3:
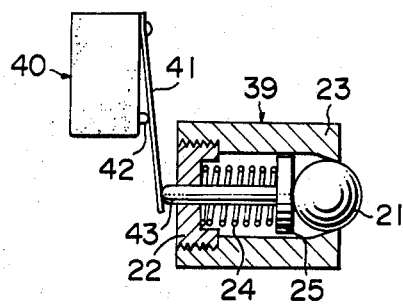
FIG. 3 is a cross section of the backup means with a control switch according to the invention.

FIG. 3 shows another form of backup means 39 which is similar to the backup means mentioned above, but which is provided with a control switch 40. Similar parts as described above are designated by like reference numerals. The control switch 40 may comprise a suitable known switch which includes a lever 41 and an armature 42 which is operated by the lever. In accordance with the invention, the plate 25 disposed between the spring 24 and the ball head 21 is provided with a rearwardly extending pin 43 which extends through an opening formed in the screwed lid 22. The free end of the pin 43 is operatively connected with the switch lever 41. During the passage of the card through the guide slot 10, when it reaches the region of the transducer 18 to move the ball head 21 rearwardly against the resilience of the spring 24, the control switch 40 can be operated, thus permitting a control of a gate which is contained in the playback circuit associated with the transducer 18.

Figure 4:
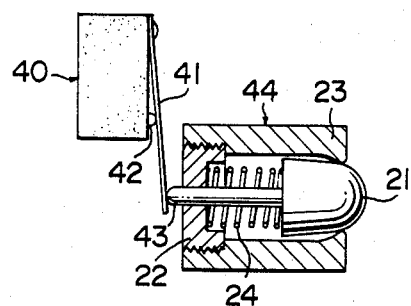
FIG. 4 is a cross section of another embodiment of the backup means with the control switch according to the invention.

FIG. 4 shows a further form of backup means 44 which is provided with a control switch as in the embodiment shown in FIG. 3. In this embodiment, the ball head 21 is in the form of a semi-sphere which is provided with a rearwardly extending pin 43. Such semispherical ball head 21 may also be used in the backup means 19 shown in FIG. 2 which is not provided with the control switch 40. It is only necessary that the ball head according to the invention is provided with a projecting spherical surface, but it should be understood that the configuration of the projecting surface of the ball head is not limited to a spherical form, but may be elliptical or simply a smooth convex surface with similar effect.

Having described the invention, what is claimed is:

1. In a card reader, for cards having a coded region formed of a magnetic medium, comprising a body defining a guide slot of a width which permits a card to be passed therethrough, and a transducer located adjacent to the guide slot for reading information recorded on a card as the card passes through the guide slot: the improvement which comprises backup means disposed on the opposite side of the guide slot as said transducer and in an opposing relationship with the transducer for maintaining a card passing through the slot adjacent said transducer as the card passes said transducer, said backup means including a ball head having a generally spherical surface which is normally biased into its operative position directly across the slot from said transducer at which it extends into the guide slot to define a gap between said generally spherical surface and said transducer of a length which is less than the thickness of the card, said backup means further including spring means for biasing the ball head into its operative position, and support means for normally maintaining the ball head in its operative position and for permitting the ball head to move away from the transducer against the resilience of the spring means while urging the card against the transducer as the card is moved through the guide slot.

2. In a card reader according to claim 1 in which the support means comprises a cylindrical socket having one end remote from the transducer closed by a lid and having an opening in its other end proximate the transducer which is formed by a detent lip, the ball head and spring means being disposed within the cylindrical socket, and the spring means urging the ball head to partially project through the opening.

3. In a card reader according to claim 2 in which the ball head is spherical in configuration.

4. In a card reader according to claim 2 in which the ball head is semi-spherical in configuration and has a spherical portion which projects through the opening.

5. In a card reader according to claim 1, wherein the end of said cylindrical socket remote from said transducer has an aperture therethrough, and further including a pin extending from said ball head and through said aperture, and a control switch positioned relative to said pin so that said switch is operated in conjunction with a movement of said pin caused by movement of the ball head.

6. In a card reader according to claim 5 in which the control switch includes a lever arm operatively connected with the pin and an armature which is operated upon by the lever arm.

7. In a card reader according to claim 1 in which the body is integrally molded from a synthetic resin material, the molded body including a mounting structure for supporting the transducer and backup means in predetermined orientations.

8. In a card reader of the type including a body having a pair of opposed surfaces defining there between a guide slot dimensioned to receive cards having information recorded thereon, and a transducer responsive to the information recorded on the cards and positioned adjacent one of the surfaces defining the guide slot for reading-out the information stored on the cards as the cards are inserted in the guide slot; the improvement which comprises a body having a smooth convex surface portion positioned directly across the guide slot from said transducer for contacting a card at a single point of contact adjacent said transducer when the card is within the guide slot, mounting means for mounting said body with the convex surface thereof extending into the guide slot to define a gap less than a thickness of a card between said transducer and said convex surface and for permitting displacement of said body in a direction away from said transducer as a card is inserted within the guide slot and within the gap less than the thickness of a card, and biasing means for biasing said body toward said transducer to maintain the gap less than the thickness of a card when no card is inserted therein and for maintaining the convex surface portion of the body in contact with a card inserted in the guide slot at a point directly opposite said transducer to maintain the card adjacent said transducer.

9. In a card reader according to claim 8, further comprising switch means defining a switch coactive with said body having the convex surface for closing when said body is displaced by a card inserted within the gap.

10. In a card reader according to claim 8, wherein the smooth convex surface portion of said body is a generally spherical surface portion.

* * * * *